(12) United States Patent
Hoefken

(10) Patent No.: US 7,871,516 B2
(45) Date of Patent: Jan. 18, 2011

(54) DECANTER WITH SWIVEL DISCHARGE PIPE

(75) Inventor: Marcus Hoefken, Erlangen (DE)

(73) Assignee: Invent Umwelt-und Verfahrenstechnik AG, Erlangen (DE)

(*) Notice: Subject to any disclaimer, the term of this patent is extended or adjusted under 35 U.S.C. 154(b) by 51 days.

(21) Appl. No.: 12/309,273

(22) PCT Filed: Jun. 30, 2007

(86) PCT No.: PCT/EP2007/005818
§ 371 (c)(1),
(2), (4) Date: Jan. 13, 2009

(87) PCT Pub. No.: WO2008/014856
PCT Pub. Date: Feb. 7, 2008

(65) Prior Publication Data
US 2009/0236278 A1    Sep. 24, 2009

(30) Foreign Application Priority Data
Aug. 4, 2006    (DE) .................. 10 2006 036 591

(51) Int. Cl.
B01D 21/24    (2006.01)
(52) U.S. Cl. ..................... 210/242.1; 210/540
(58) Field of Classification Search .............. 210/122, 210/242.1, 242.3, 540
See application file for complete search history.

(56) References Cited

U.S. PATENT DOCUMENTS

| | | | | |
|---|---|---|---|---|
| 836,335 | A * | 11/1906 | Nichols | 210/242.1 |
| 4,154,678 | A * | 5/1979 | Kole | 210/242.1 |
| 4,182,679 | A * | 1/1980 | Van Hekle | 210/242.3 |
| 4,693,821 | A * | 9/1987 | Goronszy et al. | 210/242.1 |
| 4,892,666 | A * | 1/1990 | Paulson | 210/540 |
| 5,106,494 | A * | 4/1992 | Norcross | 210/242.3 |
| 5,126,040 | A * | 6/1992 | Braid | 210/242.3 |
| 5,358,644 | A | 10/1994 | Dennis | |
| 6,287,460 | B1 * | 9/2001 | Van Schie | 210/540 |
| 6,406,617 | B1 * | 6/2002 | Brauchli | 210/122 |
| 2002/0157996 | A1 * | 10/2002 | Glasgow | 210/122 |
| 2005/0189304 | A1 * | 9/2005 | Thompson | 210/242.1 |

FOREIGN PATENT DOCUMENTS

| | | |
|---|---|---|
| DE | 295 14 481 U1 | 2/1996 |
| DE | 196 36 153 A1 | 3/1998 |
| DE | 201 21 708 U1 | 6/2003 |
| EP | 0 979 668 A2 | 2/2000 |

OTHER PUBLICATIONS

US Filter, United States Filter Corporation, Tech Products, Edwardsville, KS.

* cited by examiner

Primary Examiner—Christopher Upton
(74) Attorney, Agent, or Firm—Manabu Kanesaka

(57) ABSTRACT

The invention relates to a decanter for separating a supernatant protruding from a sewage sludge in a sludge tank (1) having a withdrawal device (4) attached to a first end (E1) of a pivot-mounted discharge pipe (3), wherein for discharging the supernatant flowing through the discharge pipe (3) near a second end (E2) opposite of the withdrawal device (4) a flexible hose (14) is provided, which is connected to a connecting piece (13) that is firmly mounted to the base relative to the pivoting bearing. In order to improve the robustness of the decanter, the invention provides that the discharge pipe (3) is received at its second end (E2) pivoting around a pivoting axis (A) in a pivoting bearing (2) having two bearing blocks (17) supported on a base.

14 Claims, 4 Drawing Sheets

DECANTER WITH SWIVEL DISCHARGE PIPE

BACKGROUND OF THE INVENTION AND RELATED ART STATEMENT

The invention relates to a decanter.

A decanter is known from the prospectus "USFilter" of the company United States Filter Corporation, Edwardsville, Kans. 66111 from the year 2004. In this connection, the discharge pipe is axially connected to a connection piece via a flexible hose. To stabilize the jointed connection created by the hose, hinged joints are provided on both sides of the hose, which joints are permanently connected with the connection piece and the discharge pipe. The hinged joints are not especially stable, particularly when under the influence of torsional forces. Apart from this, the swivel connection between the connection piece and the discharge pipe created by hinged joints and hose connection requires a relatively large amount of space.

An object of the invention is to eliminate the disadvantages as per the state of technology. In particular, a decanter is to be specified whose swivel connection has an improved stability and robustness.

SUMMARY OF THE INVENTION

According to the provisions of the invention, it is provided that the second end of the discharge pipe is mounted swivelably around a swivel axis in a swivel bearing having two bearing blocks supported against a base.—Turning away from the state of technology, with the construction proposed by the invention, the swivel axis no longer runs through the hose, in other words, the hose is no longer part of the swivel device. As provided by the invention, the function of the "swiveling" of the discharge pipe and the function of the "compensation of the changes in shape of the hose due to the swivel motions of the discharge pipe" are separated from each other. In this connection, the term "discharge pipe" is in particular understood to also mean an end section of the discharge pipe or a pipe placed radially at the end on the end section of the discharge pipe.—The construction provided by the invention is particularly robust and stable. It can be made relatively inexpensively.

According to an advantageous embodiment, the withdrawal device comprises a withdrawal pipe running vertically to the discharge pipe with a suctioning slit running in axial direction. The withdrawal pipe is usefully attached in the middle to the discharge pipe. A V-shaped sheet of metal can be attached opposite the suctioning slit at a specified distance which can be 2 to 15 cm. An inlet of larger soil particles is prevented by the proposed slit width between the sheet of metal and the withdrawal pipe.

According to a further embodiment, a first flange is provided in the vicinity of the first end for the detachable attachment of the withdrawal device. This simplifies a repair or a replacement of the withdrawal device.

Furthermore, a second flange can be provided in the vicinity of the second end of the discharge pipe for the detachable connection to an end section of the discharge pipe held in the swivel bearing. In particular, the provision of the first and the second flange makes it possible to adjust the length of the discharge pipe to the respective requirements. In this connection, the constructive embodiment of the end section of the discharge pipe contained in the swivel bearing and the withdrawal device can remain unchanged.

According to a further, particularly advantageous embodiment, the flexible hose is connected to a further connection piece which essentially extends radially from the end section. The further connection piece is usefully attached with its axis essentially vertically to the swivel axis on the end section. In a particularly simple constructive embodiment, the end section can thus be a T pipe section on whose one end the second flange is provided and whose other end is positioned radially to a pipe which is held in the bearing blocks and is able to swivel around the swivel axis. In this connection, a rotatable pin extending into the pipe mounted between the bearing blocks can provided rotatably and detachably in each of the bearing blocks. In particular, the pin can be mounted in a floating bearing held in the pipe.

Naturally the swivel bearing can also be otherwise arranged: by way of example, the bearing blocks can have breakthroughs with a diameter which is slightly larger than the outer diameter of the pipe. The pipe can be led through the breakthroughs so that it protrudes over the bearing blocks on both sides. Instead of the bearing blocks, the pipe can also be contained swivelably in a pipe holder, in particular in a double-clamp pipe holder.

According to a further embodiment of the invention, a swivel device for swiveling the discharge pipe around the swivel axis is provided. The swivel device can comprise an electric cable winch whose cable is conducted over a guide roll and is secured in the vicinity of the first end of the discharge pipe. The swivel device can comprise a platform which contains the cable winch and is supported by at least one support against the base. In particular, the suggested swivel device can be formed like a "crane" with which the discharge pipe can be swiveled. When the discharge pipe is in an essentially vertical position, the withdrawal device in particular is usefully accessible via the platform. This simplifies cleaning, maintenance or repair measures.

According to a further embodiment, the swivel device is secured to the base. The base can be the bottom and/or the wall of the settling tank.

According to a particularly advantageous, alternate embodiment of the invention, the base is a frame made of metal. This permits the decanter to be made as a ready-to-mount unit. Such a ready-to-mount unit can comprise the frame with the swivel bearing attached thereto and the connection piece attached thereto. In this connection, the hose connection between the end section of the discharge pipe and the connection piece can be pre-mounted. Moreover, the ready-to-mount unit can also comprise the swivel device. It is particularly easy to put such a ready-to-mount unit into operation. It must only be placed in a settling tank, then affixed to the bottom of the settling tank, and the connection piece connected to a discharge connection provided on the wall of the settling tank.

According to an alternate embodiment of the invention, the frame can also be equipped with floating bodies. In this case, the decanter is formed like a float and can be used swimming in the clarifier.

BRIEF DESCRIPTION OF THE DRAWINGS

Examples will now be used to describe the invention in more detail based on the drawings. The figures are listed below.

DETAILED DESCRIPTION OF PREFERRED EMBODIMENTS

Figure 1:
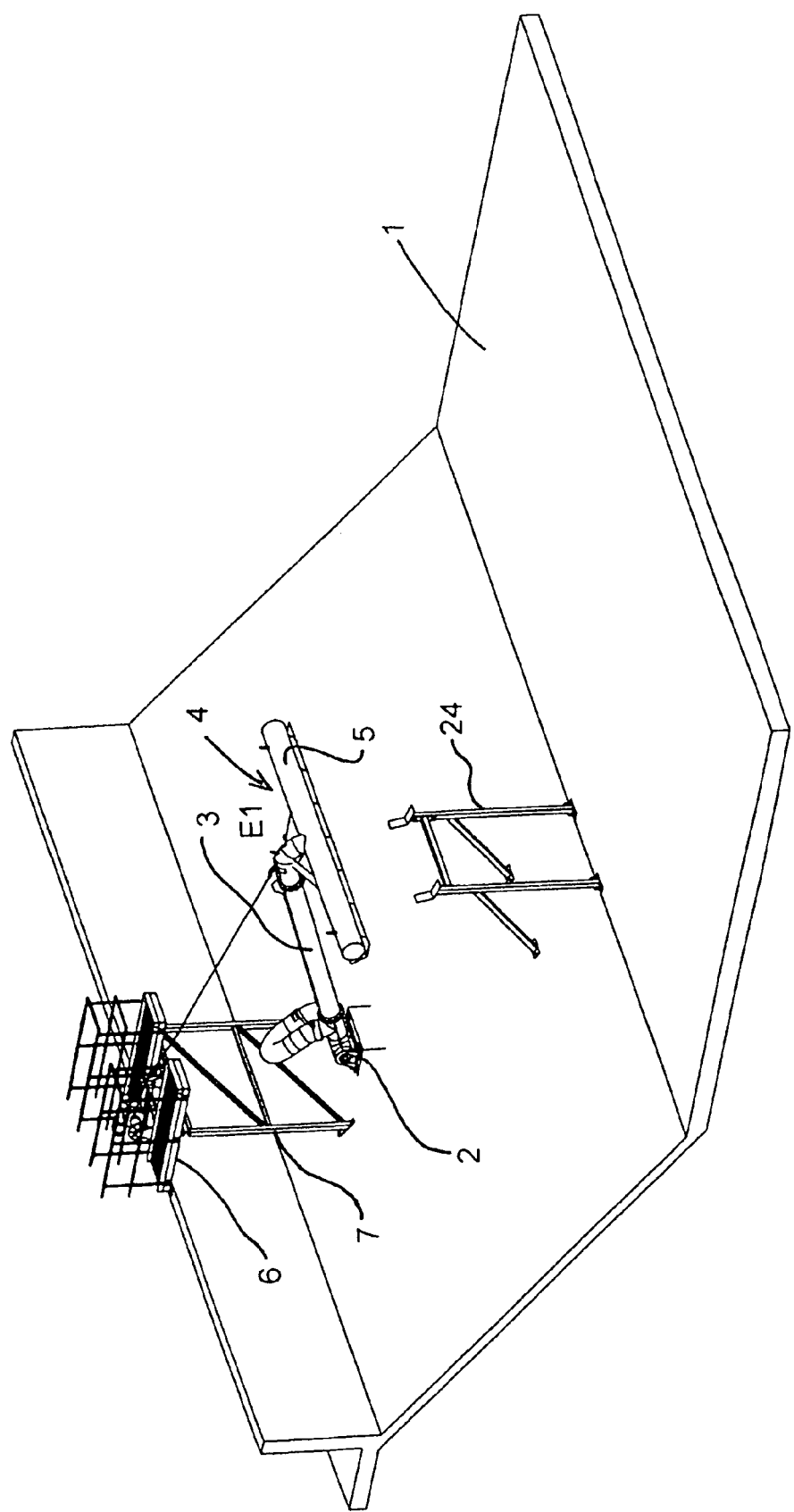
FIG. 1 a view in perspective of a decanter.

FIG. 1 shows a view in perspective of a detail of a clarifier 1 whose bottom and walls are made of concrete, for example. A decanter is attached in the settling tank 1. The decanter comprises a swivel bearing generally designated as reference sign 2 which is secured to the clarifier 1. A discharge pipe 3 is held swivelably in swivel bearing 2 on whose first end E1 a withdrawal device generally designated as reference sign 4 is attached. The withdrawal device 4 comprises a withdrawal pipe 5 which extends essentially vertically to the axis of the discharge pipe 3. A platform 6 is supported via support 7 in the settling tank 1.

Figure 2:
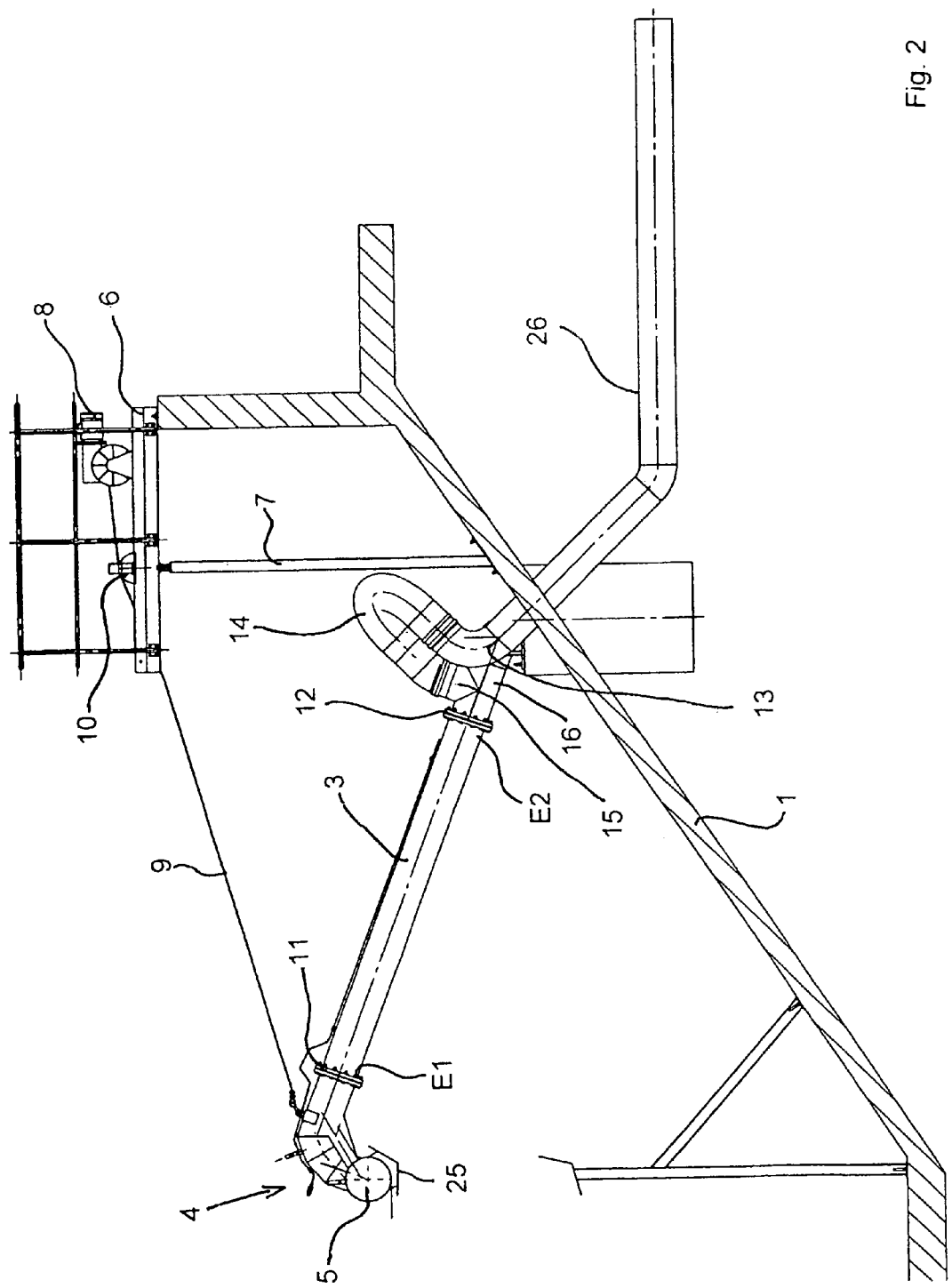
FIG. 2 a schematic sectional view through the decanter in accordance with FIG. 1, FIG. 3 a view in perspective of a swivel bearing and FIG. 4 a schematic sectional view through the swivel bearing in accordance with FIG. 3.

As is particularly apparent when viewed together with FIG. 2, a cable winch 8 is mounted on the platform 6. A cable 9 contained on the cable winch 8 is secured via a guide roll 10 also attached to the platform 6 in the vicinity of the first end of the withdrawal device 4.

A first flange 11 is provided on the first end E1 for the connection of the discharge pipe 3 to the withdrawal device 4. The discharge pipe 3 has a second flange 12 on its second end E2 opposite the first end E1 for the connection to the swivel bearing 2. FIG. 2 shows a connection piece with the reference sign 13 connected permanently to the clarifier 1. The connection piece 13 is connected via a flexible hose 14 to a further connection piece 15 which extends radially from one end section 16 of the discharge pipe 3.

Figure 3:
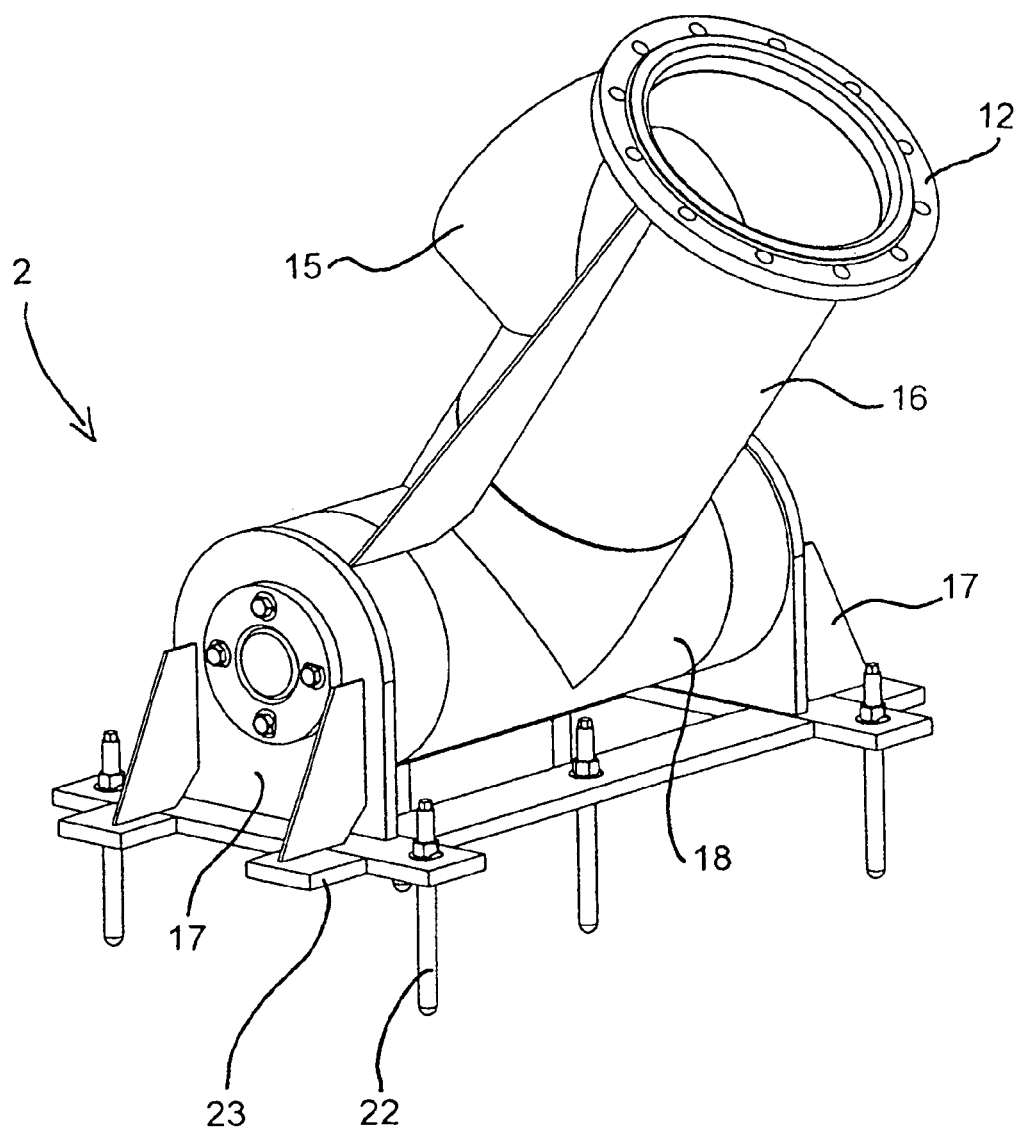
Figure 4:
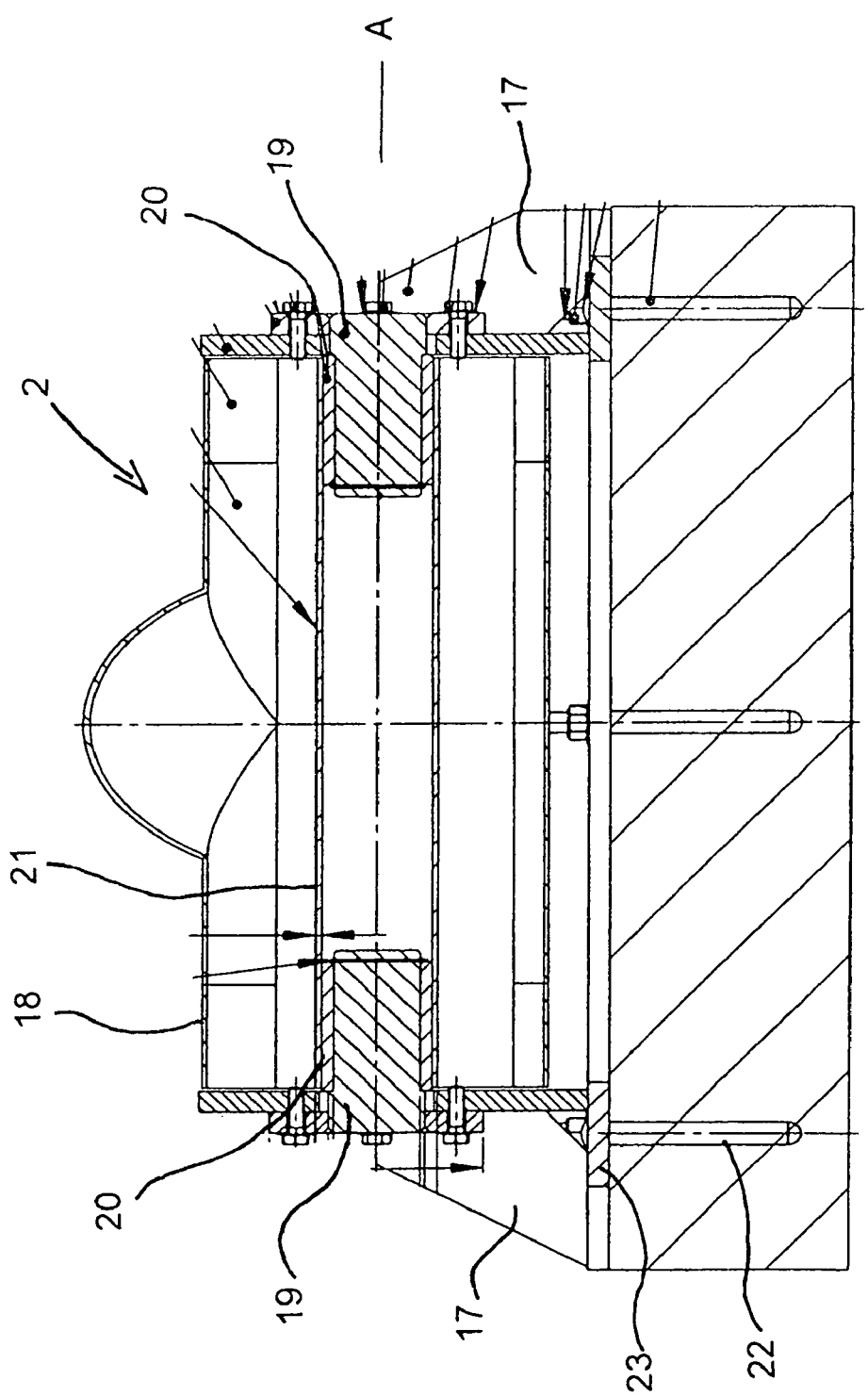

FIGS. 3 and 4 show the swivel bearing 2 in detail. A pipe 18 is rotatably mounted between two bearing blocks 17. The end section 16 of the discharge pipe 3 extends from the pipe 18 in essentially the radial direction. The further connection piece 15 extends essentially in the radial direction from the end section 16. An axis of the further connection piece 15 thus runs essentially vertically to the swivel axis A of the swivel bearing 2 shown in FIG. 4.

Pins 19 pointing to the interior of the pipe 18 are detachably attached to the bearing blocks 17 which pins are mounted in floating bearings 20. The floating bearings 20 are held in an inner pipe 21 secured in pipe 18. Bolts 22 pierce through a bearing block frame 23 in which the bearing blocks 17 are contained.

The function of the decanter is as follows:

In an idle position, the discharge pipe 3 can be deposited on a support device 24 supported in settling tank 1. To decant an excess, the withdrawal device 4 is raised high enough via the cable winch 8 so that a suction slit not shown in detail here which is located behind a V-shaped metal sheet 25 of the withdrawal pipe 5 is located just below the surface of an supernate. Using a pump, for example, the supernate can then be suctioned through the suction slit into the withdrawal pipe 5 and be conducted away via the flexible hose 14 through the discharge pipe 3 to the connection piece 13 and from there through a pipeline 25 leading away from the connection piece 13.

As is particularly obvious in FIG. 2, the hose 14 is not part of the swivel bearing 2. In particular, the hose 14 does not absorb the weight of the discharge pipe 3 attached thereto withdrawal device 4. The weight of the discharge pipe 3 with the withdrawal device 4 attached thereto is absorbed by the swivel bearing 2 as provided by the invention. By having the further discharge support 15 extend in an essentially vertical direction from the end section 16, a bend over can be implemented in the hose 14 whereby the swiveling motions of the discharge pipe 3 can be easily absorbed.

In the present example, the swivel bearing 2, the supports 7, the platform 6 and the connection piece 13 are mounted on the clarifier 1. According to a further—not shown here—embodiment form of the invention, it is also possible to provide a common frame made in particular from metal on which both the swivel bearing 2 and the connection piece 13 are mounted. Moreover, in addition to the frame, mounting can be performed on the platform 6 and the supports 7. With this a decanter can be furnished as a ready-to-mount unit which can be placed as a whole in a clarifier tank 1 for mounting.

According to a further—not shown—embodiment form of the invention, it is likewise possible to mount the swivel bearing 2 and the discharge support 13 in a common frame. The frame can be provided with floating bodies so that the complete decanter is able to float like a float and can be placed floating in clarifier 1. Also in this case, a cable winch 8 with which the withdrawal device 4 can be swiveled is provided on the float.

REFERENCE DESIGNATION LIST

1 Clarifier
2 Swivel bearing
3 Discharge pipe
4 Withdrawal device
5 Withdrawal pipe
6 Platform
7 Support
8 Cable winch
9 Cable
10 Guide roll
11 First flange
12 Second flange
13 Connection piece
14 Hose
15 Further connection piece
16 End section
17 Bearing block
18 Pipe
19 Pin
20 Floating bearing
21 Inner pipe
22 Bolt
23 Bearing block frame
24 Support device
25 Pipeline
A Swivel axis
E1 First end
E2 Second end

The invention claimed is:

1. A decantor for separating a supernate of sewage sludge in a clarifier, comprising:
   a withdrawal device attached to a first end of a discharge pipe,
   a flexible hose provided in a vicinity of a second end of the discharge pipe to conduct off the supernate flowing through the discharge pipe, the flexible hose being connected with a connection piece, and
   a swivel bearing permanently mounted on a base, wherein the second end of the discharge pipe is mounted swivelably around a swivel axis of the swivel bearing, and the swivel bearing has two bearing blocks supported by the base.

2. The decantor as defined in claim 1, wherein the withdrawal device comprises a withdrawal pipe running vertically to the discharge pipe with a suction slit running in an axial direction thereof.

3. The decantor as defined in claim 1, wherein a first flange is provided for detachable attachment of the withdrawal device to the discharge pipe.

4. The decantor as defined in claim 1, wherein a second flange is provided in a vicinity of the swivel bearing for detachable connection of the discharge pipe to an end section extending from the swivel bearing.

5. The decantor as defined in claim 4, wherein the flexible hose is connected to a further connection piece extending essentially radially from the end section.

6. The decantor as defined in claim 5, wherein the further connection piece has an axis essentially normal to the swivel axis and is integral with the end section.

7. The decantor as defined in claim 1, wherein a pin extending in a bearing pipe disposed between the bearing blocks, is detachably provided on each of the bearing blocks.

8. The decantor as defined in claim 7, wherein the pin is mounted in a floating bearing held in the bearing pipe.

9. The decantor as defined in claim 1, wherein a swivel device having the swivel bearing is configured for swiveling the discharge pipe around the swivel axis.

10. The decantor as defined in claim 1 further comprising an electric cable winch having a cable that is conducted over a guide roll and is secured in the vicinity of the first end of the discharge pipe.

11. The decantor as defined claim 10 further comprising a platform on which the cable winch is supported, wherein the platform is supported via at least one support on the base.

12. The decantor as defined claim 1, wherein the swivel device is secured to the base.

13. The decantor as defined claim 1, wherein the base is a bottom and/or a wall of the clarifier.

14. The decantor as defined claim 1, wherein the base is a frame made of metal.

\* \* \* \* \*